Oct. 20, 1970          T. LOEW          3,535,195
BEADING APPLIQUE
Filed Nov. 17, 1967
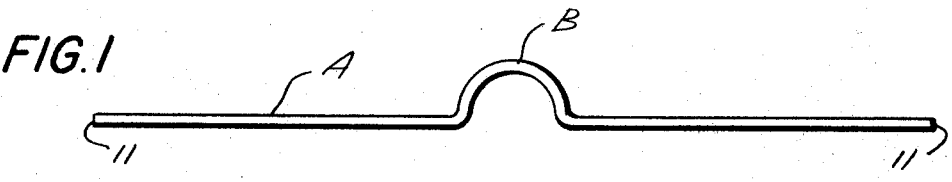
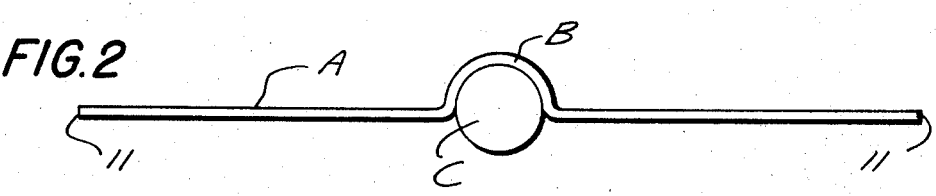
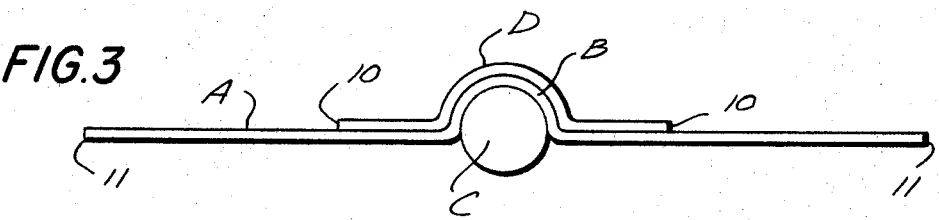
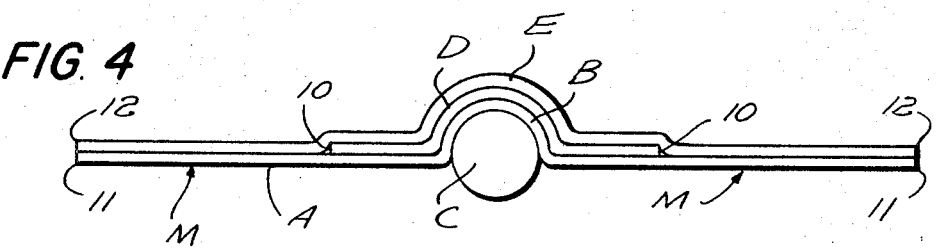
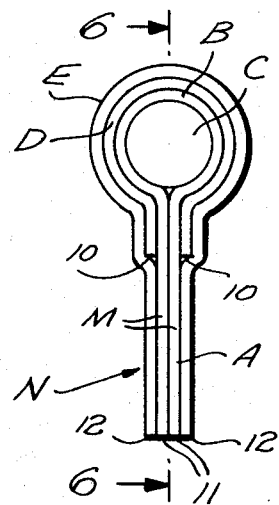
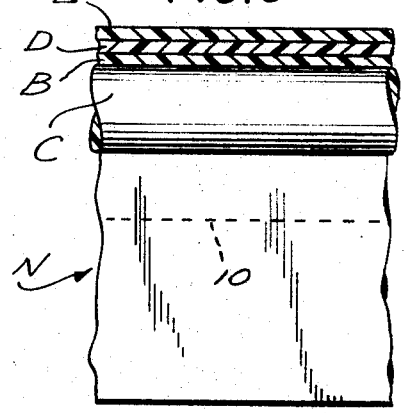
INVENTOR
THEODORE LOEW
BY
ATTORNEY

United States Patent Office 3,535,195
Patented Oct. 20, 1970

3,535,195
BEADING APPLIQUE
Theodore Loew, Schenectady, N.Y., assignor to Cee Bee Mfg. Co., Inc., Brooklyn, N.Y., a corporation of New York
Filed Nov. 17, 1967, Ser. No. 683,964
In. Cl. B32b 3/04
U.S. Cl. 161—101        3 Claims

ABSTRACT OF THE DISCLOSURE

A beading applique comprising a core embedded in a trilaminate covering with the intermediate layer having substantially less width than the inner and outer layers. The intermediate layer provides reenforcement for the construction and also may be employed to provide a decorative appearance for the applique.

---

The present invention relates to a beading applique and it particularly relates to a plastic beading construction which may be readily applied to clothing, furniture covers, household appliances, decorative trim, shoes, walls and in other connections where a decorative edging or corner may be desirable.

It is among the objects of the present invention to provide a simple, low cost, readily applied decorative beading which may be made in continuous lengths and readily applied and which may be prepared from readily available plastic or textile materials and which may be stitched or heat sealed in position.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most suitable to provide a sheet of extruded rolled or pressed thermoplastic material such as polyvinyl chloride-acetate, polyethylene, or polypropylene. The sheet or strip is first centrally deformed so as to provide a semi-circular cross-sectional channel or groove which may receive a circular cord or elongated tension member. The cord is desirably of a thermoplastic material having a diameter of 4 to 5 times the thickness of the sheet and about ¼ to ⅒ the width of the sheet or strip in which it is placed.

The preferred cord or central material is a thermoplastic material such as nylon or, less preferably, cellulose acetate, or even various polyethylene terephthalate or polyurethane derivatives.

After the cord has been embedded in the open side of the groove, preferably a reenforcement in the form of a thermoplastic or Mylar sheet or strip of the same thickness but of much less width is placed over the elevated groove on the opposite side of the cord. Then the cord with its reenforced covering is in turn covered by another strip or sheet similar to the first one, all of which are laminated together. Then the reenforced sheeting is wrapped entirely around the core and the extended ends are joined together with heat and pressure and with stitching if necessary to form the final beading construction.

If desired, the inside faces of the cover sheets or laminates may be sprayed with coloring materials, which also will apply thin adhesive layers thereto before their combination, and it has been found desirable in this connection to utilize, particularly with polyvinyl, polyethylene and polypropylene sheeting, thin layers of lacquers, varnishes or the like of the same material, such as a polyvinyl or polypropylene dissolved in a volatile solvent such as acetone or methyl ethyl ketone in 10 to 30% solutions containing about 5% of ethyl acetate and also containing 3 to 5% of a plasticiser such as dioctyl phthalate or azelate. It is also desirable to use in the sheeting, where polyvinyl acetate chloride is utilized, 10 to 30% of a plasticiser such as dioctyl phthalate or azelate.

Desirably, the entire beading should not be more than about ⅛ to ¼ inch in thickness, although it may be ½ inch, and the total height of the beading should be about ½ to 1 inch.

The tail or extensions of the laminate covers form a very convenient means of attachment and it may be utilized in between metal corners or flanges or strips of metal, leather, or fabric to give a decorative edging. Where desired, the underfaces may also be metalized, as by vacuum coating with aluminum vapors so as to give a decorative effect.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a transverse elevational view showing the edge of the strip after it has been formed.

FIG. 2 is a transverse edge view showing the strip of FIG. 1 assembled with a cord.

FIG. 3 is a transverse edge view showing the strip after it has been assembled with an opposite reenforcing narrower strip.

FIG. 4 is an edge view similar to FIGS. 1 and 3, showing a top laminate applied thereto.

FIG. 5 is an edge view after the extensions on each side have been turned down into a tail and secured together by heat and/or pressure.

FIG. 6 is a transverse sectional view upon the line 6—6 of FIG. 5.

Referring to FIG. 1 there is shown a strip or sheet A of polyvinyl chloride-acetate which has been centrally channeled at B to receive a core.

In FIG. 2 the channel B has received the cord C of nylon or cellulose acetate, which may be of an extruded cylindrical element or a twisted mass of rovings or individual fibers.

In FIG. 3 the reenforcement or superimposed strip D is applied over the channel or groove B and its edges 10 will be substantially inside of the edges 11 of the main strip A. The strip D may be metalized with vacuum applied aluminum vapors on its underface. The strip D may be of a material commercially available under the trade name Mylar.

In FIG. 4 is shown the addition of another laminate or strip E of the same width and length as the main strip A covering the reenforcement or metalized strip D. The edge 12 will coincide with the edge 11. The extensions M may be coated with an adhesive and they are then folded down into the position shown in FIG. 5 and sealed together so that the two ends M will form a single tail N which will extend down to the edges 11 and 12 and enclose the edges 10 of the intermediate strip D.

This tail N enables ready attachment to fabrics, metal sheeting, leather or plastic materials, where it is desirable to form a beading at a recess in a wall, or in furniture, or in a household appliance, on an automabile interior, or elsewhere, where a trimming is desired.

The entire structure shown in FIG. 5 is desirably of thermoplastic materials, so that they may be integrated together.

As many changes could be made in the above beading applique, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A beading applique comprising, a central cylindrical core of a material having substantial tensile strength, an inside cover for the core substantially integrally joined therewith and having side extensions which are joined together at one side of the core to form an attachment tail, an intermediate cover having less width than the inside cover and terminating laterally inwardly of the edges of the inside cover and an outside cover extending beyond the intermediate cover and to the edges of the outside cover, said covers all being integrally united in the applique and joined together in the tail.

2. The applique of claim 1 wherein said intermediate cover includes a metalized surface.

3. The applique of claim 1 wherein said intermediate cover has a width greater than the circumference of said cylindrical core and extends completely around said core.

References Cited

UNITED STATES PATENTS

| | | | |
|---|---|---|---|
| 1,745,399 | 2/1930 | Bosley | 49—475 |
| 2,139,780 | 12/1938 | Tea | 49—498 |
| 2,228,368 | 1/1941 | Schlegel et al. | 161—101 XR |
| 2,932,121 | 4/1960 | Weitzel | 161—143 XR |
| 3,086,216 | 4/1963 | Brooks et al. | 161—119 |
| 3,232,818 | 2/1966 | Loew et al. | 161—5 |

JOHN T. GOOLKASIAN, Primary Examiner

W. E. HOAG, Assistant Examiner

U.S. Cl. X.R.

161—214